April 24, 1934.         J. S. COWL         1,956,120
PACKAGE INVERTING DEVICE
Filed June 19, 1933      2 Sheets-Sheet 1

Inventor
John S. Cowl
By Philip A. H. Sewell
Attorney

April 24, 1934.  J. S. COWL  1,956,120
PACKAGE INVERTING DEVICE
Filed June 19, 1933   2 Sheets-Sheet 2
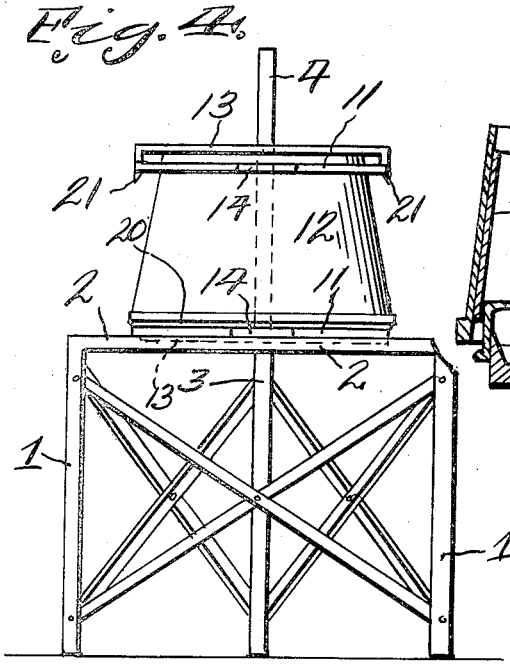
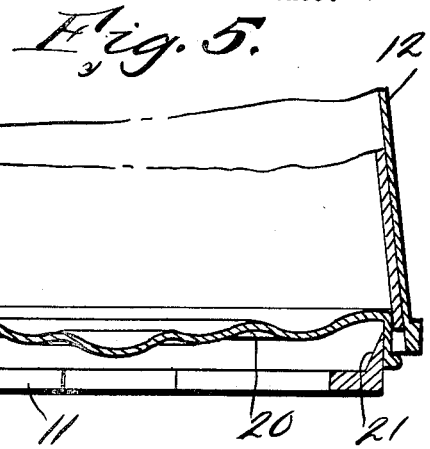
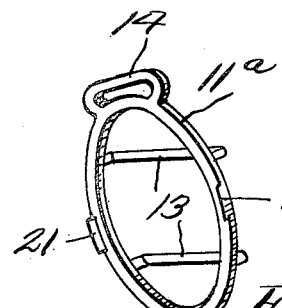
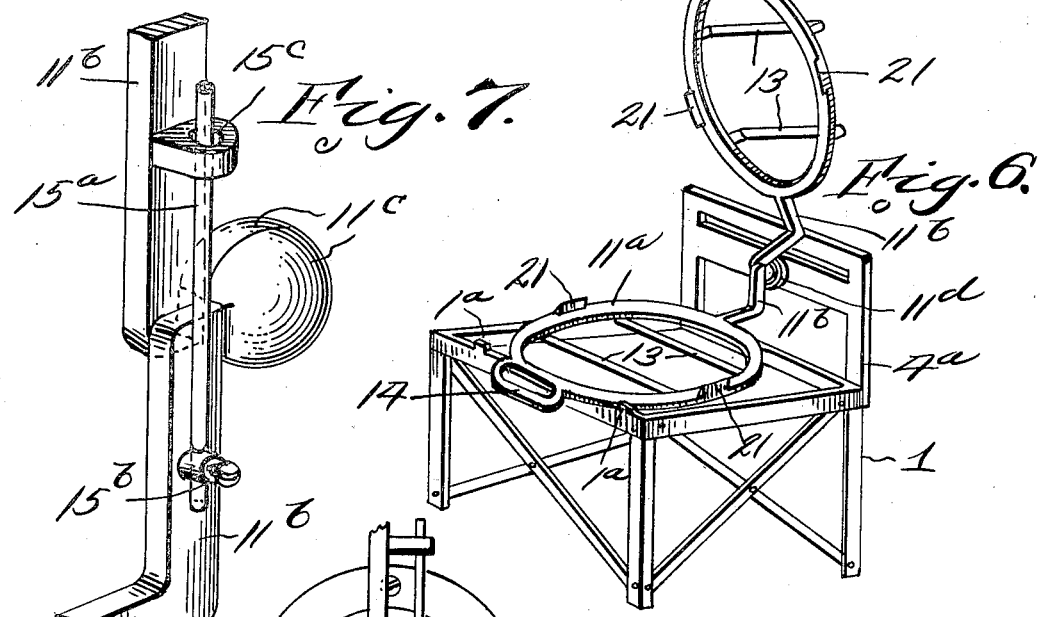
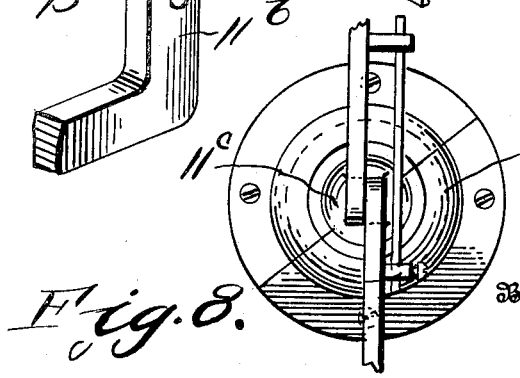
Inventor
John S. Cowl
By Philip A. H. Sewell
Attorney Patented Apr. 24, 1934

1,956,120

UNITED STATES PATENT OFFICE 1,956,120

PACKAGE INVERTING DEVICE

John S. Cowl, Swoope, Va.

Application June 19, 1933, Serial No. 676,559

10 Claims. (Cl. 226—17)

The invention relates to package inverting devices, and has for its object to provide a device of this character comprising a reversible carrier for receiving a package, for instance a basket, and gripping said basket as it is rotated or inverted and to provide a universal pivotal connection of the carrier at one side thereof to a support.

A further object is to form the carrier from registering spaced basket gripping members having universal connection with a support and means for normally forcing said registering members apart.

A further object is to form the universal connection from a vertical bar to the upper and lower ends of which the basket engaging members are hingedly connected and the vertical member with a shaft extending through an elongated slot in the support.

A further object is to provide the vertical member with springs which cooperate with the basket engaging members adjacent their hinging points and normally forcing the basket engaging members apart, and particularly the upper member upwardly when released.

A further object is to provide the hinged members with transverse offset bars adapted to grip opposite sides of the basket, particularly the small end of the basket during the reversing operation.

A further object is to provide the basket gripping members with flanges at the opposite sides thereof and adapted to engage opposite sides of the wide end of the basket and cover for preventing lateral displacement, when said wide end is resting on one of the hinged members as distinguished from when the bottom of the receptacle is within the opposite member.

A further object is to provide the stand with a central transverse portion free of braces at the upper side of the stand so the carriage can be easily inverted and a support for the outer end of the carriage and positioned to engage the handle members of the carriage members.

A further object is to form the universal connection from semispherical registering members disposed in a socket on the stand support, and to provide angularly shaped basket engaging members carried by the semispherical members and spring means for normally forcing said members apart.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 4 is a front elevation.

Figure 5 is a vertical transverse sectional view through the lower carrier member showing the facing member, basket and lining mounted thereon.

Figure 6 is a perspective view of a modified form of inverting device wherein a spherical universal connection is provided.

Figure 7 is a perspective view of the universal connection shown in Figure 6.

Figure 8 is a view in elevation of the universal connection and socket shown in Figure 6.

Figure 2:
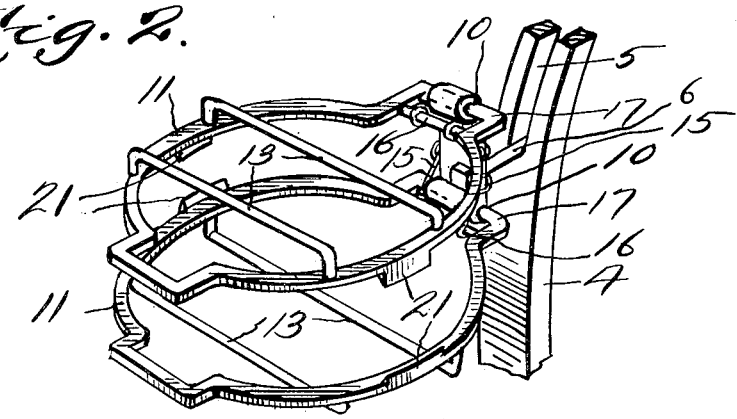
Figure 2 is a perspective view of the reversible carrier.

Referring to the drawings, and particularly to Figures 1 to 5 inclusive, the numeral 1 designates the frame of the device, which is preferably of the three-legged type and 2 a front bar extending across the stand for supporting the basket carrier hereinafter set forth. Stand 1 is preferably provided with a transverse open space A for allowing freedom of rotation of the basket as will be more specifically pointed out. The rear single leg 3 of the stand is provided with an upwardly extending arm 4 having a vertical slot 5 therein, and through which slot the pivot bolt 6 of the basket carrier extends and is vertically movable, however it normally rests in the bottom 7 of the slot, as clearly shown in Figures 1 and 3.

Figure 1:
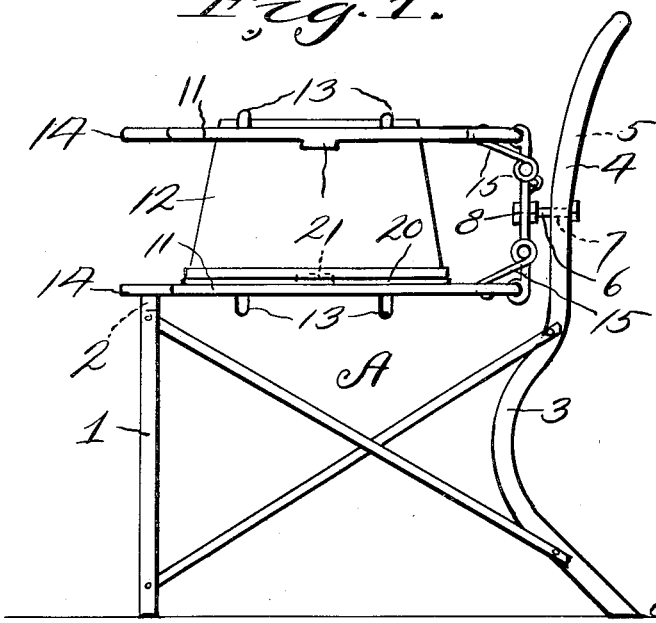
Figure 1 is a side elevation of the package inverting device.
Figure 3:
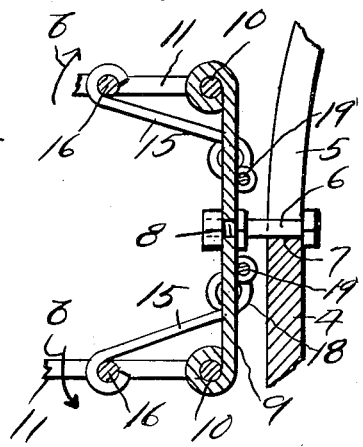
Figure 3 is a vertical longitudinal sectional view through a portion of the carrier and its support.

Rigidly attached at 8 to the pivot bolt 6 is a bar 9, forming one end of the carrier, and which bar is adapted to rotate in a vertical plane on a horizontal axis during the inverting operation, when the carrier as a whole is rotated. Hingedly connected at 10 to the ends of the bar 7 are the opposite sides 11 of the carrier, which are adapted to grip opposite sides of a basket 12 after the filling operation and to hold said basket as it is inverted. The carrier sides 11 are preferably substantially circular as shown in Figure 2, and are provided with outwardly offset bars 13 adapted to grasp one side of the basket 12, for instance the bottom, as shown in Figure 1 and hold the basket against lateral displacement and in relative relation to the other member 11 and liner carried thereby when the basket is inverted by the operator who grasps the handle members 14 during the rotating operation. It will be noted that the opposite sides of the basket and carrier will pass through the open space A of the stand as it is rotated. Carrier members 11 are normally forced to open position by means of springs 15 which urge the same in the direction of the arrows b, Figure 3, therefore it will be seen that the upper member 11 will be held out of the way of the operator during the filling operation, and within easy reach for movement into engagement with the basket at its small end after the basket is placed in position on the lining and it is desired to invert the basket for placing the cover thereon. The weight of the facing member and liner and fruit therein maintains the lower member 11 in right angular relation to the rotatable member 9 during the filling operation and against the action of the lower spring 15. Springs 15 are connected to the cross bars 16 of the members 11 in offset portions 17 thereof and provided with convolutions 18, terminating in portions 19 anchored to the member 9.

In operation the upper member 11 of the carrier is in raised position under the influence of the spring 15, and is limited in its rearward movement by the engagement of one of the bars 13 with the arm 4. The operator then places the facing member 20 on the lower carriage member 11 with the flanges 21, of the member 11 engaging within the facing member 20 as clearly shown in Figure 5. Then the lining 22 is placed on the facing member and preferably with a sustaining ring or form outside the lining, and the facing layer is then built up on the facing member 20, and the balance of the filling of the liner is promiscously done. After the filling operation the retaining ring or band is removed from the liner 22, not shown, and then the basket 12 is placed in an inverted position on the liner 22, as clearly shown in Figure 5. After the basket is placed in position as shown in Figure 1, the operator grasps the handle member 14 of the upper carriage member 11, and moves the same downwardly until the small end of the basket 12 is received and held therein against the gripping bars 13; then the operator grasps both handles 14, reverses the carrier and then releases the upper handle, allowing the same to move to open position under the influence of the spring 15, and until it is limited by the arm 4, and is out of the way of the operator for removing the facing pan 20 and placing a closure on the basket.

Referring to the modified form shown in Figures 6 to 8; in this form instead of using hinging points 10 and the pivotal bolt 6, carrier members 11a are provided with right angular shaped arms 11b, which terminate in registering semispherical members 11c forming a ball joint receivable within a split socket 11d carried by the upright 4a. In this form there is a universal pivotal connection at a single point.

In the modified form any kind of spring means may be used for normally forcing the members 11a apart, however a single leaf spring 15a is provided, which is positively anchored at 15b to one of the arms 11b and extends through an apertured lug 15c in the other arm 11b. The spring 15a in Figure 7 is tensioned whereby its free end extending through the lugs 15c will exert a rear pressure on the lug and the arm 11b, hence forcing the carriage members to open position. The action is particularly on the upper carriage section when the lower carriage section has its free end resting on the stand.

From the above it will be seen that a basket inverting device is provided wherein one end of the basket carriage is substantially universally supported, thereby allowing freedom of access to the basket in the carriage during a filling operation, and at the same time allowing a rapid and easy inverting of the basket. It will also be seen that when the upper basket holding member is released, it will be forced upwardly by a spring to a position where it will not interfere with the operator filling the basket or liner before placing the basket on the liner, and that the device may be cheaply manufactured and sold.

The frame 1 in Figure 6 is provided with upstanding lugs 1a at opposite sides of the handle 14 for preventing lateral displacement of the free end of the carrier when resting on the frame.

The invention having been set forth what is claimed as new and useful is:

1. A basket inverting device comprising a stand, a basket holding carriage carried by said stand, said carriage being rotatably and hingedly connected to the rear side of the stand, whereby said carriage may be rotated and also hingedly moved upwardly.

2. A basket reversing device comprising a base, a support carried by the rear side of said base and extending above the base, and a basket holding device rotatably and hingedly connected to the support and reversible and hingedly moved upwardly, the forward end of the basket holding device being supported by the forward side of the stand.

3. A basket inverting device comprising a stand, an upwardly extending support carried by the rear side of said stand, a reversible basket carriage, one end of said carriage being rotatably and hingedly connected to the support, said stand having an opening at the center thereof and below the carriage and free of obstructions to the carriage during a rotational reversing operation or vertical hinged movement of the carriage, the forward free end of said carriage being supported on the forward side of the stand.

4. A basket reversing device comprising a stand, a carriage having one of its ends rotatably and hingedly connected adjacent the rear of the stand, the free end of said carriage being supported solely by the forward side of the stand.

5. A basket inverting device comprising a stand, a support at the rear and above said stand, a shaft rotatably mounted in said support, a vertical bar carried by said shaft, registering basket gripping members hingedly connected to said bar at opposite sides of the shaft, springs cooperating with said basket holding members for normally forcing the same apart, means carried by the basket holding members for preventing lateral displacement of a basket therein, the forward end of said carriage being supported by the forward side of the stand.

6. A basket inverting device comprising a stand, a basket carriage carried by said stand and having one of its ends pivotally connected to the stand, said carriage comprising registering basket receiving members, transverse bars carried by said members and adapted to engage the small end of a basket when between the basket receiving members, lips carried by said basket receiving members for preventing lateral displacement of a basket and forms in the carriage and spring means for normally forcing said basket receiving members apart.

7. A basket inverting device comprising a base, of a carriage carried thereby and pivotally connected to the stand at one of its ends only, said carriage comprising registering basket receiving members, a vertical bar, a shaft carried by said vertical bar in a horizontal position and pivotally connected to the stand and spring arms carried by the vertical bar cooperating with the basket holding members, whereby said basket holding members are forced apart.

8. A device as set forth in claim 7 including a stop whereby the upper basket holding member will be limited in its upward movement under the spring action when released.

9. A device as set forth in claim 7 including outwardly offset bars carried by the basket holding members, said basket holding members being formed from substantially annular members of a size whereby the small end of a basket will be received therein and the large end will rest thereon.

10. The combination with a basket inverting device comprising a stand, a carriage carried by said stand, of a single universal connection between one end of the carriage and the stand whereby said carriage may be pivotally reversed or hingedly swung upward on said connection and means carried by the stand and cooperating with the free end of the carriage for supporting said free end.

JOHN S. COWL.